US012566453B2

(12) United States Patent
Ryu et al.

(10) Patent No.: US 12,566,453 B2
(45) Date of Patent: Mar. 3, 2026

(54) ROBOT AND CONTROL METHOD THEREOF

(71) Applicant: Samsung Electronics Co., Ltd., Suwon-si (KR)

(72) Inventors: Jungsoo Ryu, Suwon-si (KR); Jongmyeong Ko, Suwon-si (KR); Koeun Choi, Suwon-si (KR); Jiho Chu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 130 days.

(21) Appl. No.: 18/532,441

(22) Filed: Dec. 7, 2023

(65) Prior Publication Data

US 2024/0103543 A1      Mar. 28, 2024

Related U.S. Application Data

(63) Continuation of application No. PCT/KR2022/011737, filed on Aug. 8, 2022.

(30) Foreign Application Priority Data

Aug. 26, 2021      (KR) ........................ 10-2021-0113416

(51) Int. Cl.
G05D 1/644 (2024.01)
G05D 1/229 (2024.01)
G05D 105/30 (2024.01)

(52) U.S. Cl.
CPC ........... G05D 1/644 (2024.01); G05D 1/2295 (2024.01); *G05D 2105/315* (2024.01)

(58) Field of Classification Search
CPC ...... G05D 1/644; G05D 1/2295; G05D 1/435; G05D 1/0255; G05D 1/0246; G05D 1/243;
(Continued)

(56) References Cited

U.S. PATENT DOCUMENTS 11,161,250 B2     11/2021   Yeom et al.
11,364,631 B2      6/2022   Han
(Continued)

FOREIGN PATENT DOCUMENTS

JP          2000331272 A   *  11/2000
JP          2008-055578 A      3/2008
(Continued)

OTHER PUBLICATIONS

International Search Report dated Nov. 24, 2022, for International Application No. PCT/KR2022/011737.

*Primary Examiner* — Nhi Q Bui
(74) *Attorney, Agent, or Firm* — Jefferson IP Law, LLP

(57)                ABSTRACT

A robot is provided. The robot includes a camera, a driving unit, and a processor. The robot is configured to, if a plurality of users included in one group are identified in an image captured via the camera, acquire profile information of each of the plurality of users, based on the profile information, acquire group feature information including group type information of the group, priority information of the plurality of users, and preferred waypoint information of the one group, and control the driving unit to perform a route guidance function based on the group feature information and destination information.

20 Claims, 16 Drawing Sheets

(58) Field of Classification Search
CPC ......... G05D 2105/315; G05D 2107/67; G05D
2109/10; G05D 2111/10; B25J 19/02;
B25J 19/023; B25J 11/0005; B25J
11/008; B25J 11/00; B25J 5/007; B25J
5/00; B25J 9/1664; B25J 9/16; B25J
13/00; G01C 21/206; G01C 21/3484;
G10L 17/02
See application file for complete search history.

(56) References Cited

U.S. PATENT DOCUMENTS

| | | | | |
|---|---|---|---|---|
| 2010/0211304 A1* | 8/2010 | Hwang | .............. | G01C 21/3484 |
| | | | | 701/532 |
| 2016/0075026 A1* | 3/2016 | Sisbot | ................... | B25J 9/1676 |
| | | | | 700/255 |
| 2018/0283888 A1* | 10/2018 | Smith | ...................... | G08G 1/22 |
| 2019/0005545 A1 | 1/2019 | Roh et al. | | |

| | | | | |
|---|---|---|---|---|
| 2020/0089252 A1* | 3/2020 | Kim | ......................... | B25J 5/007 |
| 2020/0218254 A1 | 7/2020 | Sohn et al. | | |
| 2021/0078180 A1 | 3/2021 | Kim et al. | | |
| 2021/0081994 A1 | 3/2021 | Newell | | |
| 2021/0362337 A1* | 11/2021 | Kim | ....................... | G06V 40/20 |

FOREIGN PATENT DOCUMENTS

| | | | | | | |
|---|---|---|---|---|---|---|
| JP | 2011-000656 | A | | 1/2011 | | |
| JP | 2018-171696 | A | | 11/2018 | | |
| JP | 2021-018452 | A | | 2/2021 | | |
| JP | 2021018481 | A | * | 2/2021 | .......... | G06V 40/174 |
| KR | 10-2008-0057699 | A | | 6/2008 | | |
| KR | 10-2008-0100613 | A | | 11/2008 | | |
| KR | 10-1170686 | B1 | | 8/2012 | | |
| KR | 10-2019-0003123 | A | | 1/2019 | | |
| KR | 10-2019-0083727 | A | | 7/2019 | | |
| KR | 10-2019-0113690 | A | | 10/2019 | | |
| WO | 2018/143509 | A1 | | 8/2018 | | |

* cited by examiner

GROUP TYPE:COUPLE     GROUP TYPE:FAMILY OF THREE
ACCOMPANYING A CHILD

GROUP TYPE:FAMILY OF FOUR
ACCOMPANYING A DISABLED PERSON

GROUP TYPE:FAMILY OF THREE
ACCOMPANYING OLD PARENTS

ROBOT AND CONTROL METHOD THEREOF

CROSS-REFERENCE TO RELATED APPLICATION(S)

This application is a continuation application, claiming priority under § 365(c), of an International application No. PCT/KR2022/011737, filed on Aug. 8, 2022, which is based on and claims the benefit of a Korean patent application number 10-2021-0113416, filed on Aug. 26, 2021, in the Korean Intellectual Property Office, the disclosure of which is incorporated by reference herein in its entirety.

BACKGROUND

1. Field

The disclosure relates to a robot performing a route guidance function and a control method thereof.

2. Description of Related Art

Recently, development of technologies regarding robots that provide services to users such as a guide bot or a retail bot is actively going on. In particular, a robot performing a route guidance function to a user can provide an optimized route to the user based on map data regarding a specific space.

In case a plurality of users wished to be provided with a route guidance service, a conventional robot could not identify an optimal route based on the features of a single user or the features of each individual user, and thus there was a problem that the robot could not provide an optimal route in consideration of the features of the group wherein the plurality of users were included.

Accordingly, there has been a constant demand for a robot that performs an optimal route guidance function in consideration of the features of a group wherein a plurality of users are included.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a robot that performs a route guidance function by utilizing group feature information acquired based on profile information of each user, and a control method thereof.

Additional aspects will be set forth in part in the description which follows and, in part, will be apparent from the description, or may be learned by practice of the presented embodiments.

In accordance with an aspect of the disclosure, a robot for achieving the aforementioned purpose is provided. The robot includes a camera, a driving unit, a processor, and memory storing instructions that, when executed by the processor, cause the robot to, based on a plurality of users included in one group being identified in an image captured via the camera, acquire profile information of each of the plurality of users, and based on the profile information, acquire group feature information including group type information of the one group, priority information of the plurality of users, and preferred waypoint information of the one group, and control the driving unit to perform a route guidance function based on the group feature information and destination information.

Here, the group feature information may further include transit impossible route information and preferred speed information identified based on the acquired profile information.

Here, the processor, when executing the instructions, may identify one of the preferred waypoint information, the transit impossible route information, or the preferred speed information of the group based on at least one profile information among the profile information of each of the plurality of users based on the priority information of the plurality of users.

Also, the processor may, based on at least one user included in the one group being changed in the image captured via the camera after the plurality of users were identified, acquire profile information of the changed user, and reidentify the group feature information including the group type information of the group, the priority information of the users included in the group, and the preferred waypoint information of the group based on the acquired profile information of the user.

In addition, the memory may store priority information of users of each group type, and the processor may, based on the group type information being acquired, acquire the priority information of the plurality of users based on the information stored in the memory.

Further, the robot may further include a display, and the processor, when executing the instructions, may, based on the probability that at least one user would be included in the group being greater than or equal to a first threshold probability and smaller than a second threshold probability, identify first group type information corresponding to a case wherein the at least one user is included in the group and second group type information corresponding to a case wherein the at least one user is not included in the group, control the driving unit to perform the route guidance function based on any one of the first group type information or the second group type information, and control the display to display route information identified based on the other one of the first group type information or the second group type information.

Also, the robot may further include a display, and the processor, when executing the instructions, may, based on identifying that route change is necessary based on at least one of ambient environment information received from a server or ambient environment information acquired through the camera while performing the route guidance function on the basis of the acquired group feature information and destination information, control the display to display a user interface (UI) guiding route information corresponding to the changed route.

In addition, the robot may further include a display, and the processor, when executing the instructions, may control the display to display route information determined based on the acquired group feature information and destination information, and based on the displayed route information being selected according to a user instruction, control the driving unit to perform the route guidance function according to the displayed route information, and based on the displayed route information being changed according to the user instruction, control the driving unit to perform the route guidance function according to the changed route information.

Further, the robot may further include a microphone, and the processor, when executing the instructions, may perform the route guidance function based on a user voice received through the microphone, and based on identifying that the profile information of the plurality of users is similar, identify a main speaker among the plurality of users based on the image captured via the camera, and acquire the priority information of the plurality of users based on the identified main speaker.

Also, the profile information may include at least one of sex information, age information, belongings information, disability information, or clothes information of the users.

In accordance with another aspect of the disclosure, a control method of a robot is provided. The control method includes the operations of, based on a plurality of users included in one group being identified in an image captured via a camera, acquiring profile information of each of the plurality of users, and based on the profile information, acquiring group feature information including group type information of the one group, priority information of the plurality of users, and preferred waypoint information of the one group, and performing a route guidance function based on the group feature information and destination information.

Here, the group feature information may further include transit impossible route information and preferred speed information identified based on the acquired profile information.

Here, in the operation of acquiring the group feature information, at least one of the preferred waypoint information, the transit impossible route information, or the preferred speed information of the group may be identified based on at least one profile information among the profile information of each of the plurality of users based on the priority information of the plurality of users.

Also, the control method may further include the operations of, based on at least one user included in the one group being changed in the image captured via the camera after the plurality of users were identified, acquiring profile information of the changed user, and reidentifying the group feature information including the group type information of the group, the priority information of the users included in the group, and the preferred waypoint information of the group based on the acquired profile information of the user.

In addition, in the operation of acquiring the group feature information, based on the group type information being acquired, the priority information of the plurality of users may be acquired based on priority information of users of each group type.

Further, the operation of acquiring the group feature information may include the operation of, based on the probability that at least one user would be included in the group being greater than or equal to a first threshold probability and smaller than a second threshold probability, identifying first group type information corresponding to a case wherein the at least one user is included in the group and second group type information corresponding to a case wherein the at least one user is not included in the group. Also, the operation of performing the route guidance function may include the operations of performing the route guidance function based on any one of the first group type information or the second group type information, and displaying route information identified based on the other one of the first group type information or the second group type information.

Also, the control method may further include the operation of, based on identifying that route change is necessary based on at least one of ambient environment information received from a server or ambient environment information acquired through the camera while performing the route guidance function on the basis of the acquired group feature information and destination information, displaying a user interface (UI) guiding route information corresponding to the changed route.

In addition, the operation of performing the route guidance function may include the operations of displaying route information determined based on the acquired group feature information and destination information, and based on the displayed route information being selected according to a user instruction, performing the route guidance function according to the displayed route information, and based on the displayed route information being changed according to the user instruction, performing the route guidance function according to the changed route information.

Further, the operation of acquiring the group feature information may include the operations of, based on identifying that the profile information of the plurality of users is similar, identifying a main speaker among the plurality of users based on the image captured via the camera, and acquiring the priority information of the plurality of users based on the identified main speaker.

Also, the profile information may include at least one of sex information, age information, belongings information, disability information, or clothes information of the users.

According to the various embodiments of the disclosure, a robot can provide an optimal route in consideration of the features of a group wherein a plurality of users are included, and thus convenience of the users belonging to the group is improved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
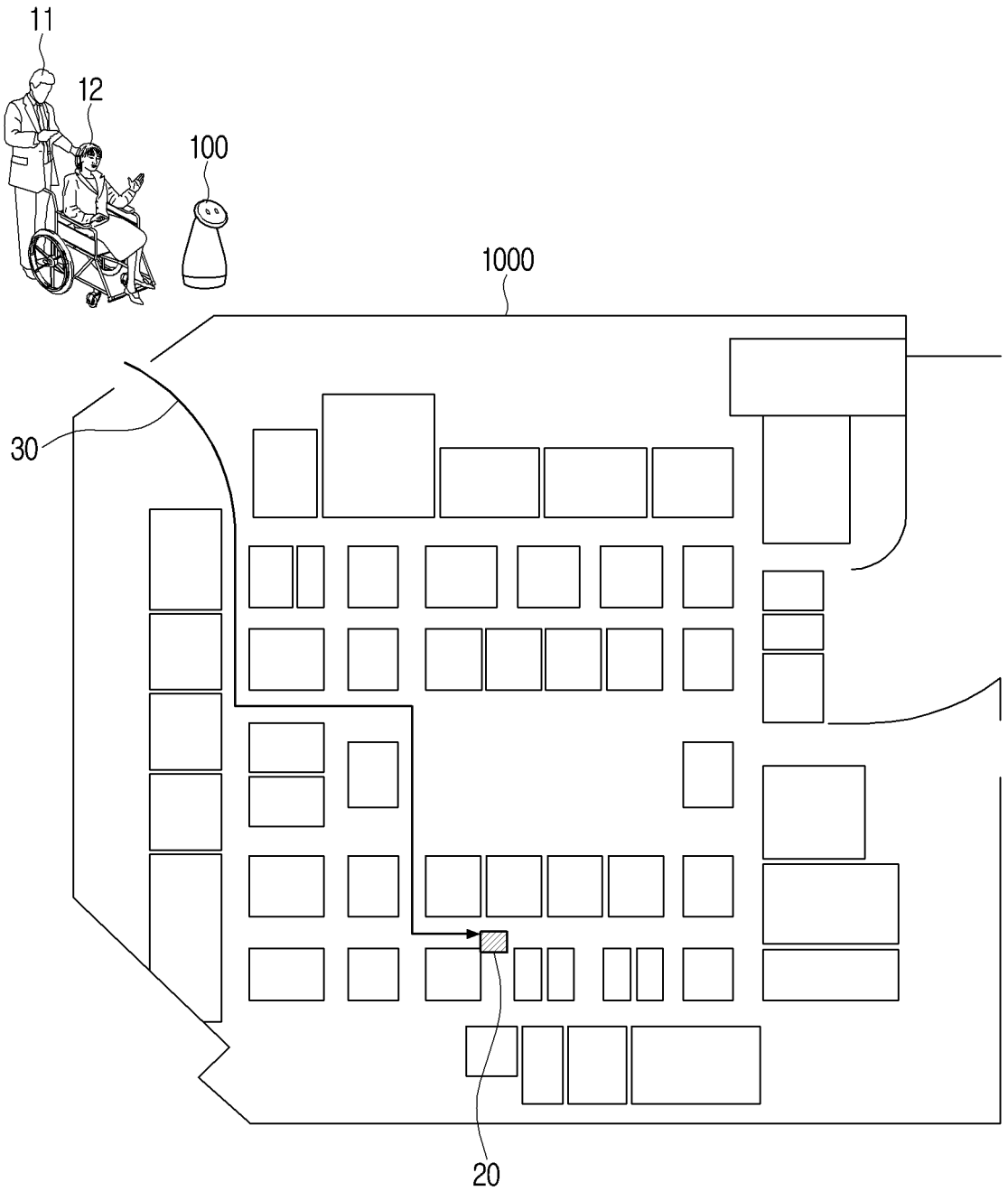
FIG. 1 is a diagram for schematically illustrating an operation of a robot according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As terms used in the embodiments of the disclosure, general terms that are currently used widely were selected as far as possible, in consideration of the functions described in the disclosure. However, the terms may vary depending on the intention of those skilled in the art, previous court decisions, or emergence of new technologies. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in the disclosure, expressions such as "have," "may have," "include," and "may include" denote the existence of such characteristics (e.g.: elements such as numbers, functions, operations, and components), and do not exclude the existence of additional characteristics.

In addition, the expression "at least one of A and/or B" should be interpreted to mean any one of "A" or "B" or "A and B."

Further, the expressions "first," "second," and the like used in the disclosure may be used to describe various elements regardless of any order and/or degree of importance. Also, such expressions are used only to distinguish one element from another element, and are not intended to limit the elements.

Also, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

In addition, singular expressions include plural expressions, unless defined obviously differently in the context. Also, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

In the disclosure, "a module" or "a part" performs at least one function or operation, and may be implemented as hardware or software, or as a combination of hardware and software. Also, a plurality of "modules" or a plurality of "parts" may be integrated into at least one module and implemented as at least one processor (not shown), except "a module" or "a part" that needs to be implemented as specific hardware.

In the disclosure, 'a user' may mean a person who is provided with a route guidance service by a robot.

FIG. 1 is a diagram for schematically illustrating an operation of a robot according to an embodiment of the disclosure.

Referring to FIG. 1, a robot 100 according to an embodiment of the disclosure may be located in a specific space 1000, and provide a route guidance service to users 11, 12 who visited the specific space 1000.

The robot 100 may receive input of information regarding a destination 20 located within the specific space 1000 from the users 11, 12, and identify a moving route 30 for guiding the users 11, 12 to the destination 20.

In case there are a plurality of users who are provided with the route guidance service by the robot 100, the robot 100 according to an embodiment needs to identify an optimal moving route in consideration of all of the features of the plurality of users for providing a service that can satisfy all of the plurality of users.

For example, in case a first user 11 and a second user 12 included in one group wish to be provided with the route guidance service by the robot 100, the robot 100 may identify the moving route 30 based on the features of the first user 11 and the second user 12.

However, while the moving route 30 that the robot 100 identified by individually considering the features of the plurality of users 11, 12 included in one group may be appropriate for the first user 11 or the second user 12 to independently move to the destination 20, it may be an inappropriate route for the first user 11 and the second user 12 to move to the destination 20 together.

For this, the robot 100 may acquire feature information of the group wherein the users 11, 12 are included based on the features of the first user 11 and the second user 12, and identify the moving route 30 based on the acquired feature information of the group and destination information.

Specifically, the moving route 30 identified based on the feature information of the group wherein the plurality of users 11, 12 are included may not include a slope so that it may be appropriate for moving of the second user 12 who is a rider of a wheelchair. Also, the moving route 30 may not include a pass having narrow width so that it may be easy for the first user 11 who assists the moving of the wheelchair rider (e.g., second user 12) to walk.

Hereinafter, various embodiments wherein more satisfying routes can be guided to users based on feature information of a group wherein a plurality of users are included will be described in more detail.

Figure 2:
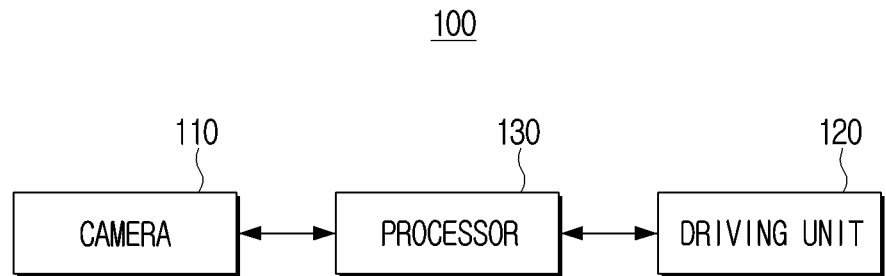
FIG. 2 is a block diagram for illustrating a configuration of a robot according to an embodiment of the disclosure.

FIG. 2 is a block diagram for illustrating a configuration of a robot according to an embodiment of the disclosure.

Referring to FIG. 2, a robot 100 may include a camera 110, a driving unit 120, and a processor 130.

The camera 110 may acquire an image by performing capturing for an area within a specific Field of View (FoV).

The camera 110 may include a lens that focuses various visible light optical signals that are reflected on objects and received into an image sensor, and an image sensor that can detect the various visible light optical signals. Here, the image sensor may include a two dimensional (2D) pixel array that is divided into a plurality of pixels.

Also, the camera 110 may include a distance sensor that acquires distance information. Specifically, the camera 110 including a distance sensor may measure the distance between the location of the robot 100 and the location of an object. The distance sensor according to an embodiment may include at least one of a Light Detection and Ranging (LIDAR) sensor or a Time of flight (TOF) sensor. Also, the camera 110 may be implemented as a depth camera.

The driving unit 120 is a device that can dive the robot 100. The driving unit 120 may adjust a driving direction and a driving speed according to control by the processor 130, and the driving unit 120 according to an embodiment may include a power generating device generating power for the robot 100 to drive (e.g.: a gasoline engine, a diesel engine, a liquefied petroleum gas (LPG) engine, an electric motor, etc. according to the used fuel (or the energy source)), a steering device for adjusting a driving direction (e.g.: manual steering, hydraulics steering, electronic control power steering (EPS), etc.), a driving device driving the robot 100 according to power (e.g., a wheel, a propeller, etc.), and the like. Here, the driving unit 120 may be implemented in modified forms according to the driving type of the robot 100 (e.g.: a wheel type, a walking type, a flying type, etc.).

The processor 130 controls the overall operations of the robot 100. Specifically, the processor 130 may be connected with each component of the robot 100, and control the overall operations of the robot 100. For example, the processor 130 may be connected with the camera 110 and the driving unit 120, and control the operations of the robot 100.

According to an embodiment, the processor 130 may be referred to by various names such as a digital signal processor (DSP), a microprocessor, a central processing unit (CPU), a micro controller unit (MCU), a micro processing unit (MPU), a neural processing unit (NPU), a controller, an application processor (AP), etc., but in this specification, it will be described as the processor 130.

The processor 130 may be implemented as a System on Chip (SoC) and large scale integration (LSI), or in the form of a field programmable gate array (FPGA). Also, the processor 130 may include a volatile memory such as a static random access memory (SRAM), etc.

If a plurality of users included in one group are identified in an image captured via the camera 110, the processor 130 according to an embodiment of the disclosure may acquire profile information of each of the plurality of users.

The profile information may include at least one of sex information, age information, belongings information, disability information, or clothes information of the users, but is not limited thereto, and the profile information may include whole information that can be utilized regarding the route guidance service provided by the robot 100.

The processor 130 may acquire group feature information of the group wherein the plurality of users are included based on the acquired profile information. The group feature information according to an embodiment may include group type information of the group wherein the plurality of users are included, priority information of the plurality of users included in the group, preferred waypoint information of the group, transit impossible route information, or preferred speed information, but is not limited thereto.

The group type information may include information on the type of the group wherein the plurality of users are included such as 'a couple,' 'a family accompanying a child,' 'a family accompanying a disabled person,' or 'same sex friends,' etc.

The priority information of the plurality of users may be information regarding the feature of which user among the plurality of users should be preferentially considered in the identification of a moving route by the robot 100. For example, with respect to a group having group type information corresponding to 'a family of three accompanying a child,' the processor 130 may acquire priority information corresponding to the feature that the child has a higher priority, and the parents have lower priorities.

The preferred waypoint information may include information regarding a place wherein it is expected that the group including the plurality of users would wish to stop by in a process of moving to the destination. For example, with respect to a group having group type information corresponding to 'a couple,' the processor 130 may acquire preferred waypoint information including information regarding 'an Italian restaurant.'

The transit impossible route information may include information regarding a place wherein it is expected that the group including the plurality of users would not be able to stop by in a process of moving to the destination. For example, with respect to a group having group type information corresponding to 'a family accompanying a disabled person,' the processor 130 may acquire transit impossible route information including information regarding 'stairs.'

The preferred speed information may include information regarding at what speed the group including the plurality of users would move to a destination. For example, with respect to a group having group type information corresponding to 'a family accompanying old parents,' the processor 130 may acquire preferred speed information including information corresponding to 'a slow moving speed.'

Also, the processor 130 may identify one of the preferred waypoint information, the transit impossible route information, or the preferred speed information of the group based on at least one profile information among the profile information of each of the plurality of users based on the priority information of the plurality of users.

The processor 130 may control the driving unit 120 to perform the route guidance function based on the acquired group feature information and the destination information. Here, the group guidance function may include a series of functions for the robot 100 to provide information related to the moving route to the users when moving to the destination while maintaining a predetermined distance with the group including the plurality of users.

Also, the destination information may include information regarding a place that the group including the plurality of users wishes to ultimately reach and information on a plurality of routes that can be selected in a process of reaching the place from the current location.

In addition, if at least one user included in one group is changed in an image captured via the camera 110 after the plurality of users were identified, the processor 130 may acquire profile information of the changed user. Here, the feature that a user included in the group was changed may mean at least one of the feature that a user included in the group was added, a user left, or a conventional user was replaced by another user.

The processor 130 may reidentify the group feature information including the group type information of the group, the priority information of the users included in the group, and the preferred waypoint information of the group, etc. based on the newly acquired profile information of the user.

Also, the robot 100 may further include a memory storing priority information of users of each group type. When the group type information is acquired, the processor 130 may acquire the priority information of the plurality of users based on the information stored in the memory. For example, the memory may include information regarding the priority of which user is the highest among a plurality of users included in a group having a specific group type.

The priority information of users of each group type according to an embodiment may be information that was acquired or updated after the robot 100 completed provision of a service a plurality of times. However, according to another embodiment, the robot 100 may receive the priority information of users of each group type from an external server, and store the information in the memory.

Also, the processor 130 may identify the probability that a specific user would be included in a group among a plurality of users included in an image captured via the camera 110, and perform the route guidance function based on the identified probability. Here, the processor 130 may input the image captured via the camera 110 into a neural network model, and acquire information regarding the probability that a specific user would be included in a group.

Specifically, in case it is identified that the probability that a specific user included in an image would be included in a group is smaller than a first threshold probability, the processor 130 may identify group type information corresponding to a case wherein the user is not included in the group, and perform the route guidance function based on the identified group type information. Also, in case it is identified that the probability that a specific user included in an image would be included in a group is greater than or equal to a second threshold probability higher than the first threshold probability, the processor 130 may identify group type information corresponding to a case wherein the user is included in the group, and perform the route guidance function based on the identified group type information.

For example, in case an adult man, an adult woman, and a child are included in an image acquired through the camera 110, the processor 130 may identify the probability that the child would be included in a group, and in case the identified probability is smaller than the first threshold probability, the processor 130 may identify group type information corresponding to 'a couple,' and provide an appropriate route for a couple. In contrast, in case the identified probability is greater than or equal to the second threshold probability, the processor 130 may identify group type information corresponding to 'a family of three accompanying a child,' and provide an appropriate route for a family of three accompanying a child.

Also, in case the identified probability is greater than or equal to the first threshold probability and smaller than the second threshold probability, the processor 130 may identify first group type information corresponding to a case wherein a specific user is included in a group and second group type information corresponding to a case wherein the user is not included in the group.

The processor 130 may control the driving unit 120 to perform the route guidance function based on any one of the first group type information or the second group type information. Also, the robot 100 may further include a display, and the processor 130 may control the display to display the identified route information based on the other one of the first group type information or the second group type information.

Further, while the processor 130 performs the route guidance function based on the acquired group feature information and the destination information, the processor 130 may identify whether there is a need to change the route based on at least one of ambient environment information received from a server or ambient environment information acquired through the camera. Here, the ambient environment information may include information regarding various events that occur on a route guided to the users.

Also, if it is identified that route change is necessary, the processor 130 may control the display to display a user interface (UI) guiding route information corresponding to the changed route.

In addition, the processor 130 may control the display to display a route determined based on the acquired group feature information and the destination information, and when the displayed route information is selected according to a user instruction, the processor 130 may control the driving unit 120 to perform the route guidance function according to the displayed route information. If the displayed route is changed according to a user instruction, the processor 130 may control the driving unit 120 to perform the guidance function according to the changed route information.

Meanwhile, the robot 100 may further include a microphone. The processor 130 may perform the route guidance function based on a user voice received through the microphone. Specifically, the processor 130 may acquire profile information of a user based on a user voice received through the microphone, and acquire group type information of the group wherein the user is included based on the identified profile information, and perform the route guidance function.

Also, if it is identified that the profile information of the plurality of users is similar, the processor 130 may identify a main speaker among the plurality of users based on the image captured via the camera 110. In case it is identified that the age (or the age group) of the plurality of users and whether they have disabilities are the same, the processor 130 may identify who the main speaker is among the plurality of users.

Here, the main speaker may mean a user who performs interaction with the robot 100 the most actively among the plurality of users. The processor 130 may acquire the priority information of the plurality of users based on the identified main speaker. The processor 130 according to an embodiment may identify that the user identified as the main speaker has the highest priority in the group.

Figure 3:
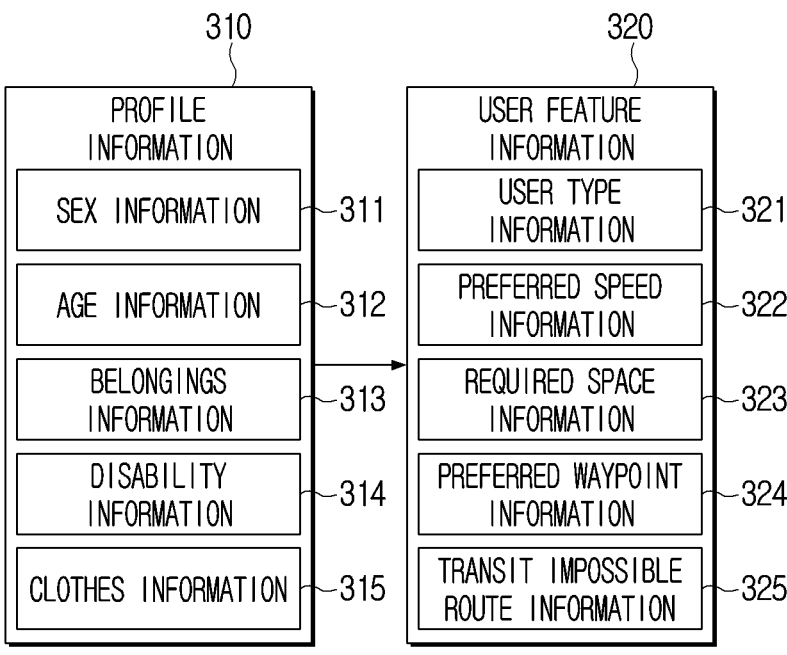
FIG. 3 is a diagram for illustrating acquisition of user feature information according to an embodiment of the disclosure.

FIG. 3 is a diagram for illustrating acquisition of user feature information according to an embodiment of the disclosure.

Referring to FIG. 3, a robot 100 may acquire user feature information 320 of each of a plurality of users based on profile information 310 of each of the plurality of users included in one group.

The profile information according to an embodiment may include at least one of sex information 311, age information 312, belongings information 313, disability information 314, or clothes information 315, but is not limited thereto.

Here, the disability information 314 may include information related to disabilities causing impaired mobility. Also, the disability information 314 may include information regarding whether a user rides a wheelchair.

The sex information 311 may include information regarding the sex of a user. The age information 312 may include information on the age or the age group of a user. The belongings information 313 may include information regarding whether a user is carrying belongings. The disability information 314 may include information regarding whether a user has a disability. The clothes information 315 may include information on at least one of the type, the color, the size, or the manufacturer's brand of the clothes that a user is wearing.

The robot 100 may acquire various kinds of information included in the profile information 310 by inputting the image acquired through the camera 110 into a neural network model.

The user feature information 320 according to an embodiment may include at least one of user type information 321, preferred speed information 322, required space information 323, preferred waypoint information 324, or transit impossible route information 325, but is not limited thereto.

The user type information 321 may include information regarding the category of a user classified according to a specific standard such as 'a man in his 20s,' 'a woman in her 30s,' 'a child,' 'an old man,' 'a middle-aged woman,' etc. According to an embodiment, the robot 100 may acquire the user type information 321 based on the sex information 311 and the age information 312.

The preferred speed information 322 may include information regarding at what speed a user would move to a destination. According to an embodiment, the robot 100 may acquire the preferred speed information 322 based on at least one of the sex information 311, the age information 312, the belongings information 313, or the disability information 314.

The required space information 323 may include information regarding the width of a pass that is required when a user moves. According to an embodiment, the robot 100 may acquire the required space information 323 based on at least one of the age information 312, the belongings information 313, or the disability information 314.

The preferred waypoint information 324 may include information regarding a place wherein it is expected that a user would wish to stop by in a process of moving to a destination. According to an embodiment, the robot 100 may acquire the preferred waypoint information 324 based on at least one of the sex information 311, the age information 312, or the clothes information 315.

The transit impossible route information 325 may include information regarding a place wherein it is expected that a user may not be able to stop by in a process of moving to a destination. According to an embodiment, the robot 100 may acquire the transit impossible route information 325 based on the belongings information 313 or the disability information 314.

Figure 4:
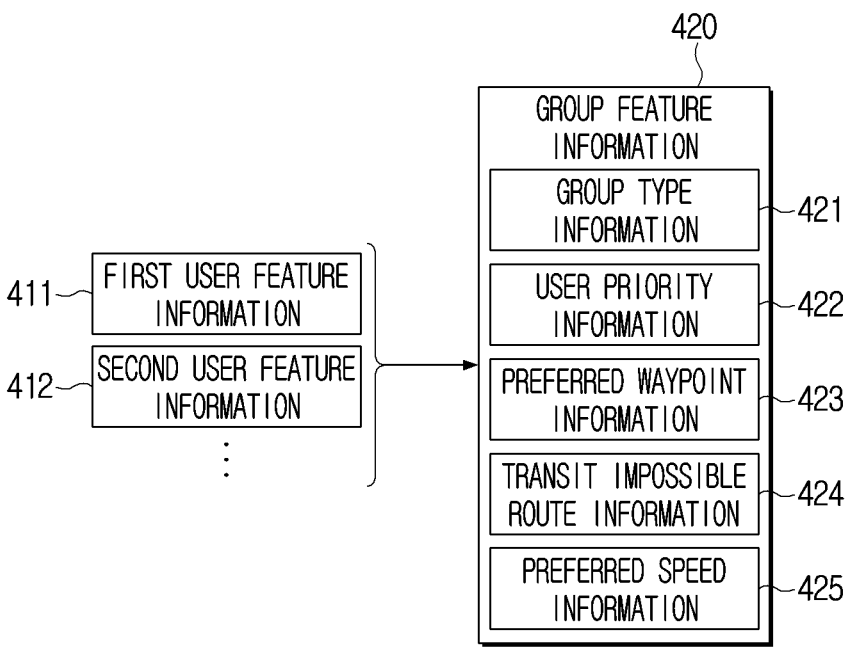
FIG. 4 is a diagram for illustrating acquisition of group feature information according to an embodiment of the disclosure.

FIG. 4 is a diagram for illustrating acquisition of group feature information according to an embodiment of the disclosure.

Referring to FIG. 4, a robot 100 may acquire group feature information 420 of a group wherein a plurality of users are included based on user feature information 411, 412, etc. of each of the plurality of users.

The group feature information 420 according to an embodiment may include at least one of group type information 421, user priority information 422, preferred waypoint information 423, transit impossible route information 424, or preferred speed information 425, but is not limited thereto.

The group type information 421 may include information regarding the type of the group wherein the plurality of users are included such as 'a couple,' 'a family accompanying a child,' 'a family accompanying a disabled person,' or 'same sex friends,' etc. According to an embodiment, the robot 100 may acquire the group type information 421 based on user type information corresponding to the plurality of users. For example, in case the user type information included in first user feature information 411 is regarding 'a woman in her 20s,' and the user type information included in second user feature information 412 is regarding 'a man in his 20s,' the robot 100 may acquire the group type information 421 corresponding to 'a couple.'

The user priority information 422 may be information regarding which information among the plurality of user feature information 411, 412, etc. should be preferentially considered in identification of a moving route. According to an embodiment, the robot 100 may acquire the user priority information 422 based on the user feature information of individual users and the acquired group type information 421. For example, in case the first user is 'a disabled person' and the second user is 'a non-disabled person,' the robot 100 may acquire the user priority information 422 such that the first user has the highest priority in the group based on the disability information included in the first user feature information 411 and the group type information 421 corresponding to 'a family accompanying a disabled person.'

The preferred waypoint information 423 may include information regarding a place wherein it is predicted that the group including the plurality of users would wish to stop by in a process of moving to a destination. According to an embodiment, the robot 100 may identify a user having a high priority in the group based on the user priority information 422, and acquire the preferred waypoint information 423 of the group based on the preferred waypoint information of the identified user. For example, regarding a group having group type information corresponding to 'a family accompanying a child,' the robot 100 may identify that the user having a high priority in the group is 'a child' who is the first user, and identify the preferred waypoint information 423 of the group based on the preferred waypoint information included in the first user feature information 411.

The transit impossible route information 424 may include information regarding a place wherein it is predicted that the group including the plurality of users would not be able to stop by in a process of moving to a destination. According to an embodiment, the robot 100 may identify a user having a high priority in the group based on the user priority information 422, and acquire the transit impossible route information 424 of the group based on the transit impossible route information of the identified user. For example, regarding a group having group type information corresponding to 'a family accompanying a disabled person,' the robot 100 may identify that the user having a high priority in the group is 'a disabled person' who is the second user, and identify the transit impossible route information 424 of the group based on the transit impossible route information included in the second user feature information 412.

The preferred speed information 425 may include information regarding at what speed the group including the plurality of users would move to a destination. According to an embodiment, the robot 100 may identify the preferred speed information 425 of the group corresponding to the moving speed of the user having the slowest speed based on the preferred speed information included in the user feature information of each of the plurality of users included in the group. For example, regarding a group including only the first user and the second user, in case information corresponding to 'a normal moving speed' is included in the first user feature information 411 and information corresponding to 'a slow moving speed' is included in the second user feature information 412, the robot 100 may acquire the preferred speed information 425 of the group corresponding to 'a slow moving speed' which is the moving speed of the second user having a slower speed.

Figure 5:
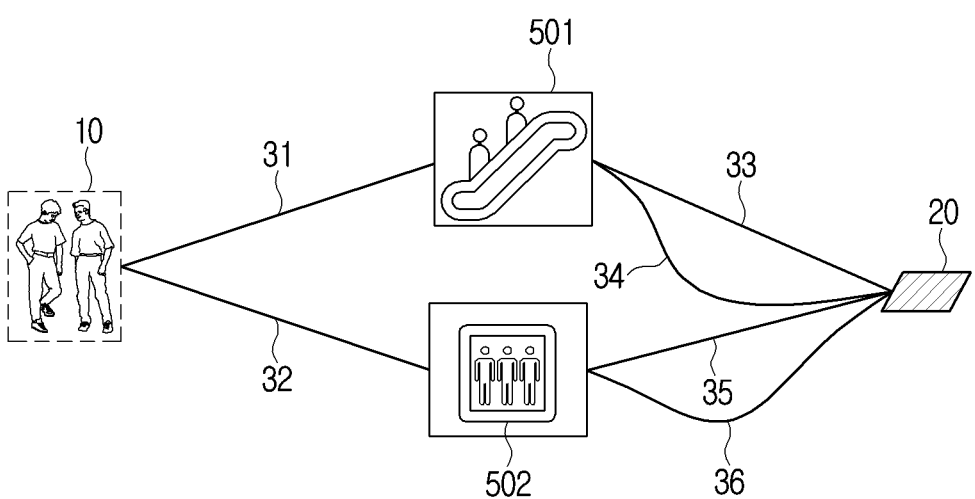
FIG. 5 is a diagram for illustrating various routes that a robot can guide according to an embodiment of the disclosure.

FIG. 5 is a diagram for illustrating various routes that a robot can guide according to an embodiment of the disclosure.

Referring to FIG. 5, in order for a plurality of users included in one group 10 to reach a destination 20, the group 10 may go through one time of moving between floors, and then move along any one route among four types of routes 33 to 36. Specifically, means for moving between floors that can be selected in a process that the group 10 moves to the destination 20 may include an escalator 501 and an elevator 502. In a case (e.g., via route 31) wherein the group 10 uses the escalator 501 in moving between floors, the group 10 may go through moving between floors, and then move along any one route from among two types of routes 33, 34. Meanwhile, in a case (e.g., via route 32) wherein the group 10 uses the elevator 502 in moving between floors, the group 10 may go through moving between floors, and then move along any one route from among the remaining two types of routes 35, 36.

The robot 100 according to an embodiment may provide information regarding means for moving between floors to be used by the group 10 in moving to the destination 20 and information regarding a route to be selected after going through moving between floors to the users included in the group 10. Specifically, the robot 100 may perform the route guidance function based on the feature information of the group 10 and the destination information.

Here, destination information may include at least one of traffic information corresponding to a plurality of selectable routes, event information, information regarding means for moving between floors, or information regarding the length and the tilt of each of partial moving routes 31 to 36 constituting the entire moving route. The destination information may be identified based on the information that the robot 100 acquired through the camera 110, etc., but it may be information that was received from an external server and received.

FIGS. 6A, 6B, 6C, and 6D are diagrams for illustrating a route guiding operation based on feature information of a group according to various embodiments of the disclosure.

Figure 6A:
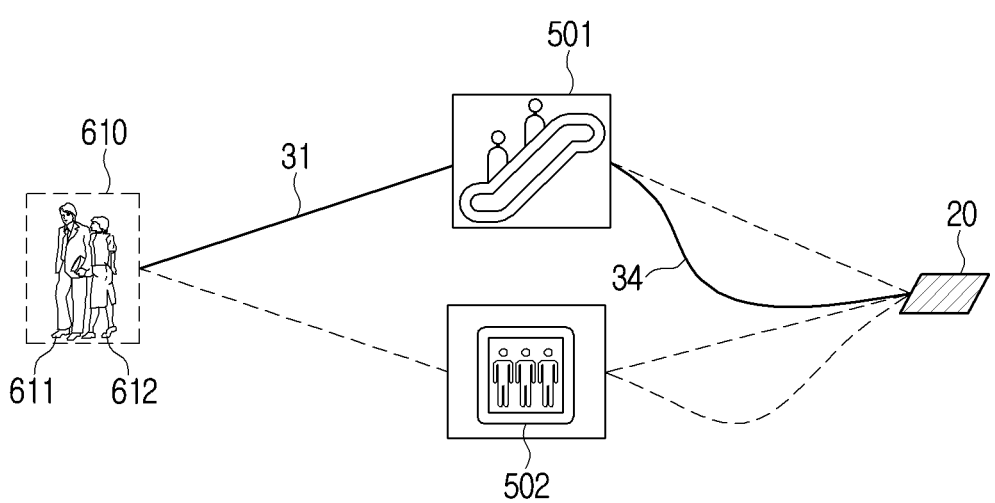
FIGS. 6A, 6B, 6C, and 6D are diagrams for illustrating a route guiding operation based on feature information of a group according to various embodiments of the disclosure.

Referring to FIG. 6A, in a first group 610 having group type information corresponding to 'a couple,' a man in his 30s (e.g., user 611) and a woman in her 30s (e.g., user 612) may be included. The robot 100 may identify a route 31 of using the escalator 501 of which use time is short based on the information regarding means for moving between floors included in the destination information. Also, the robot 100 may acquire preferred waypoint information of the first group 610 based on clothes information corresponding to the woman in her 30s (e.g., user 612) having a high priority in the first group 610, and identify that a route 34 that can stop by a women's clothing section is an appropriate route for the first group 610 based on the acquired preferred waypoint information. Ultimately, the robot 100 may provide information regarding the entire moving route 31+34 to the users 611, 612 belonging to the first group 610, and perform the route guidance function corresponding to the provided information.

Figure 6B:
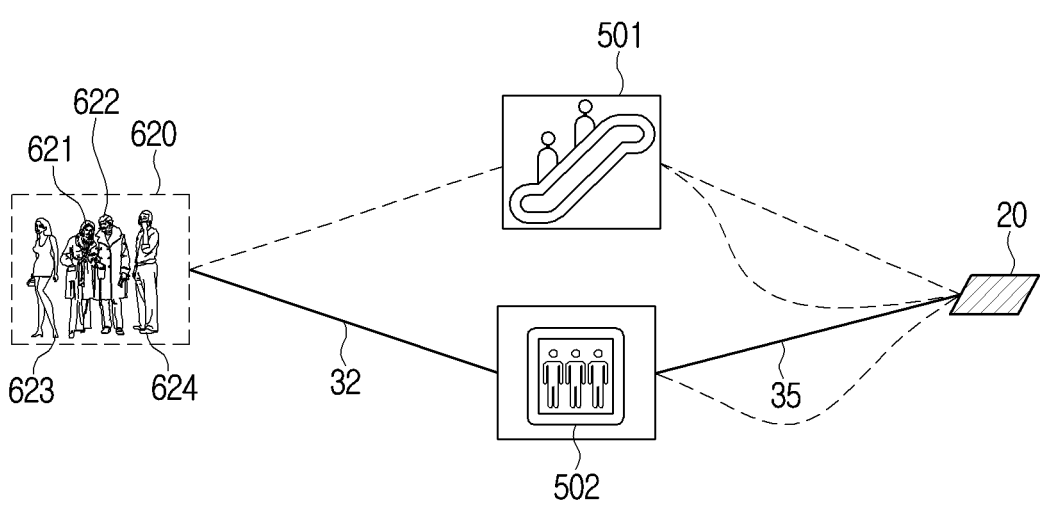

Referring to FIG. 6B, in a second group 620 having group type information corresponding to 'a family of four accompanying old parents,' an old woman (e.g., user 621), an old man (e.g., user 622), a middle-aged woman (e.g., user 623), and a middle-aged man (e.g., user 624) may be included. The robot 100 may identify that the slant of the route 31 going through moving between floors through the escalator 501 is steep based on the group type information of the second group 620 and the destination information, and identify a route 32 going through moving between floors through the elevator 502 such that it would be convenient for the second group 620 including users of old ages to pass. Also, the robot 100 may acquire preferred speed information of the second group 620 based on preferred speed information of the users 621, 622 having high priorities in the second group 620, and identify that a route 35 having shorter length, wherein it is expected that the second group 620 would be able to reach the destination 20 within a short time even by moving at a slow speed, is an appropriate route for the second group 620 based on the acquired preferred speed information. Ultimately, the robot 100 may provide information regarding the entire moving route 32+35 to the users 621 to 624 belonging to the second group 620, and perform the route guidance function corresponding to the provided information.

Figure 6C:
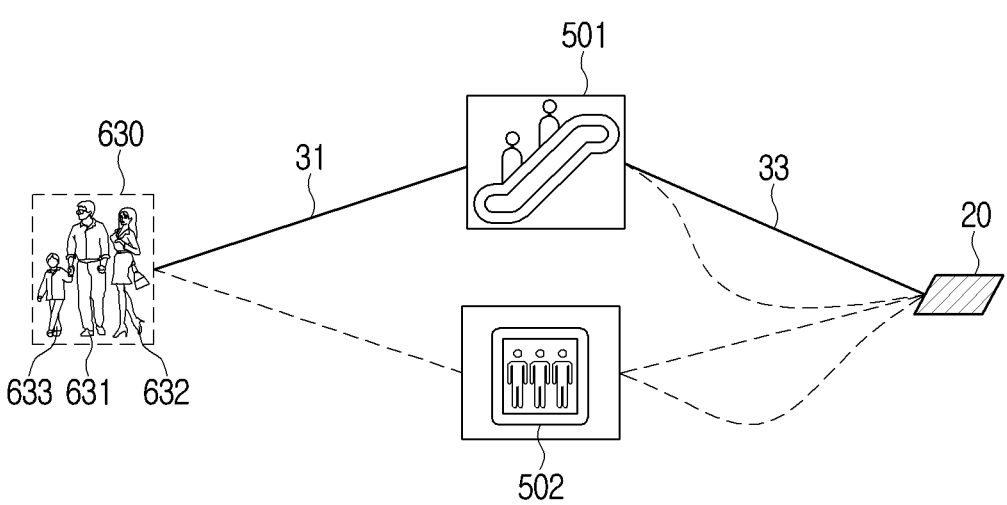

Referring to FIG. 6C, in a third group 630 having group type information corresponding to 'a family of three accompanying a child,' a middle-aged man (e.g., user 631), a middle-aged woman (e.g., user 632), and a child (e.g., user 633) may be included. The robot 100 may identify a route 31 of using the escalator 501 of which use time is short based on the information regarding means for moving between floors included in the destination information. Also, the robot 100 may identify a route 34 wherein a construction event occurred based on the event information included in the destination information, and identify that a route 33 wherein a construction event did not occur and is thus safer for the child (e.g., user 633) is an appropriate route for the third group 630, based on age information corresponding to the child (e.g., user 633) having a high priority in the third group 630. Ultimately, the robot 100 may provide information regarding the entire moving route 31+33 to the users 631 to 633 belonging to the third group 630, and perform the route guidance function corresponding to the provided information.

15

Figure 6D:
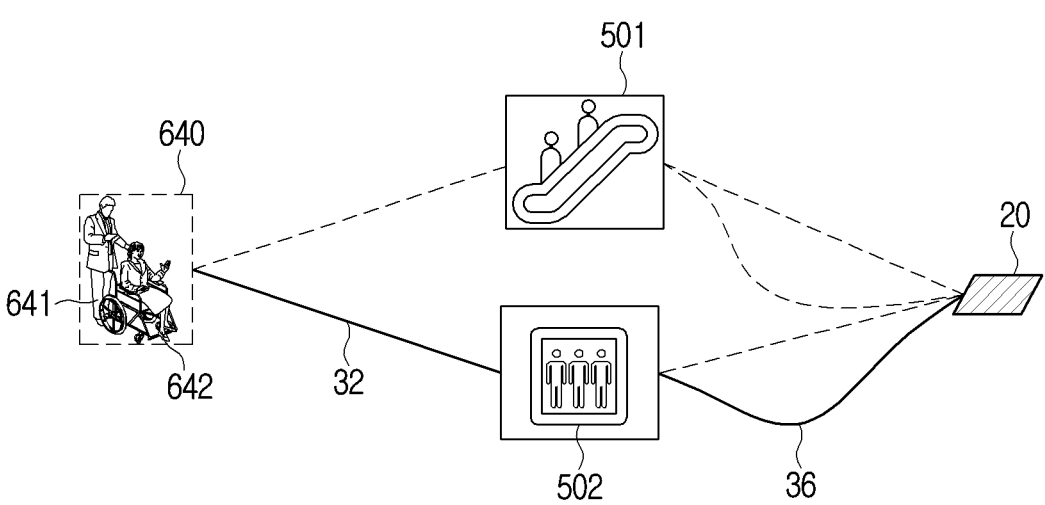

Referring to FIG. 6D, in a fourth group 640 having group type information corresponding to 'a family of two accompanying a disabled person,' a middle-aged man (e.g., user 641) and a disabled woman (e.g., user 642) may be included. The robot 100 may acquire transit impossible route information of the fourth group 640 based on disability information corresponding to the disabled woman (e.g., user 642) having a high priority in the fourth group 640, and identify a route 32 going through moving between floors through the elevator 502 that can be used by the disabled woman (e.g., user 642) riding a wheelchair based on the acquired transit impossible route information. Also, the robot 100 may acquire required space information of the fourth group 640 based on required space information corresponding to the disabled woman (e.g., user 642) having a high priority in the fourth group 640, and identify that a route 36 having a relatively small amount of traffic is an appropriate route for the fourth group 640 based on the acquired required space information and the destination information. Ultimately, the robot 100 may provide information regarding the entire moving route 32+36 to the users 641, 642 belonging to the fourth group 640, and perform the route guidance function corresponding to the provided information.

Figure 7A:
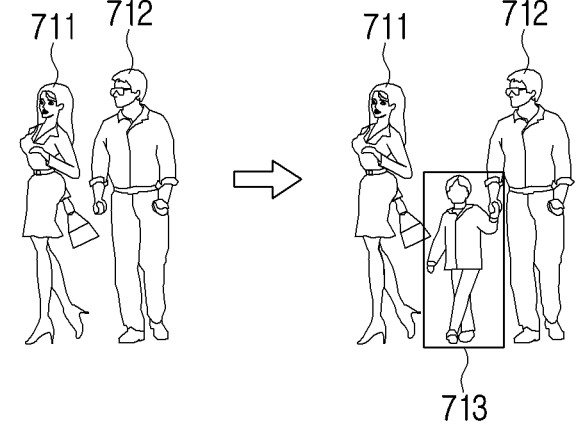
FIGS. 7A and 7B are diagrams for illustrating a reidentifying operation of group feature information according to various embodiments of the disclosure.
Figure 7B:
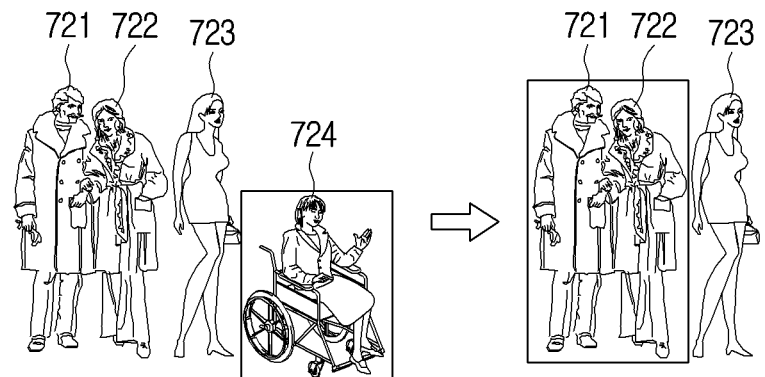

FIGS. 7A and 7B are diagrams for illustrating a reidentifying operation of group feature information according to various embodiments of the disclosure.

If at least one user included in one group is changed in an image captured via the camera 110 after a plurality of users were identified, the robot 100 according to an embodiment of the disclosure may acquire profile information of the changed user, and reidentify the group feature information based on the acquired profile information.

Referring to FIG. 7A, a robot 100 may identify a plurality of users 711, 712, and identify that the group including the plurality of identified users 711, 712 has group type information corresponding to 'a couple.' Afterwards, in case a user 713 who was not included in the previously identified group is identified in the image captured via the camera 110, the robot 100 may acquire profile information of the added user 713, and reidentify the group feature information corresponding to 'a family of three accompanying a child' wherein the child (e.g., user 713) has the highest priority based on age information of the user 713 included in the acquired profile information. The robot 100 may provide a moving route appropriate for the group to the plurality of users 711 to 713 again based on the reidentified group feature information, and perform the route guidance function corresponding to the provided information.

Referring to FIG. 7B, a robot 100 may identify a plurality of users 721 to 724, and identify that the group including the plurality of identified users 721 to 724 has group type information corresponding to 'a family of four accompanying a disabled person.' Afterwards, in case a user 724 who was included in the previously identified group is not identified in the image captured via the camera 110, the robot 100 may reidentify the group feature information corresponding to 'a family of three accompanying old parents' wherein the old parents (e.g., users 721, 722) have the highest priorities based on the profile information of the remaining users 721 to 723 excluding the profile information of the user 724 who left. The robot 100 may provide a moving route appropriate for the group to the plurality of users 721 to 723 again based on the reidentified group feature information, and perform the route guidance function corresponding to the provided information.

According to the aforementioned description, in case there is another group member other than a plurality of users included in an image previously acquired through the camera 110, or in case a plurality of users do not belong to one group, the robot 100 can provide a more appropriate route guidance service to the users belonging to the group through reidentification of the group feature information.

Figure 8:
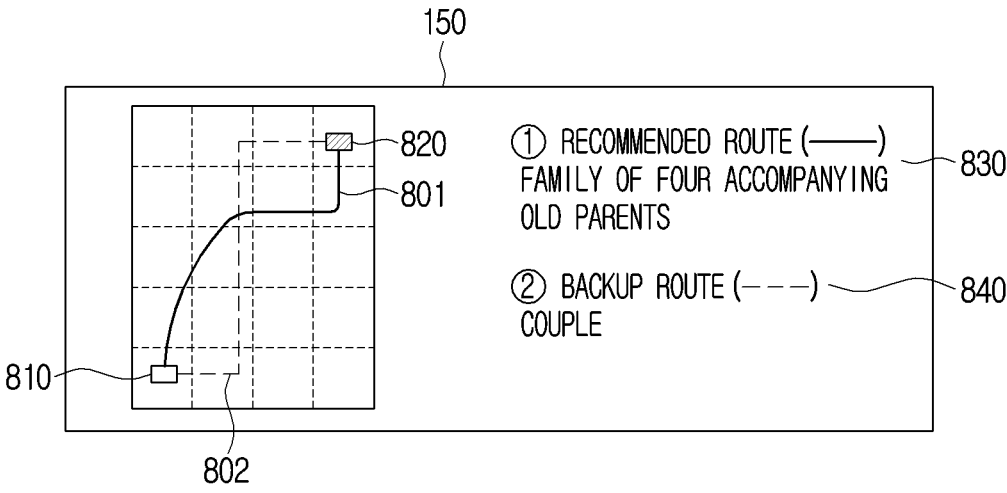
FIG. 8 is a diagram for illustrating an operation of providing a plurality of routes according to an embodiment of the disclosure.

FIG. 8 is a diagram for illustrating an operation of providing a plurality of routes according to an embodiment of the disclosure.

Referring to FIG. 8, a robot 100 may further include a display 150. The robot 100 may identify the probability that a specific user among a plurality of users included in an image captured via the camera 110 would be included in a group, and perform the route guidance function based on the identified probability.

In case the identified probability is greater than or equal to a first threshold probability and smaller than a second threshold probability, the robot 100 may identify first group type information corresponding to a case wherein the specific user is included in the group, and second group type information corresponding to a case wherein the user is not included in the group. Further, the robot 100 may perform the route guidance function based on any one of the first group type information or the second group type information.

For example, in case 'an old man,' 'an old woman,' 'a man in his 20s,' and 'a woman in her 20s' are included in the image captured via the camera 110, the robot 100 may identify the probability that the old man and the old woman located on an edge of the image would be included in the group. In case the identified probability is greater than or equal to the first threshold probability and smaller than the second threshold probability, the robot 100 may respectively identify the first group type information (a family of four accompanying old parents) corresponding to a case wherein the old man and the old woman are included in the group, and the second group type information (a couple) corresponding to a case wherein the old man and the old woman are not included in the group.

The robot 100 according to an embodiment may identify a first route 801 reaching from a starting point 810 to a destination 820 based on the first group type information, and identify a second route 802 reaching from the starting point 810 to the destination 820 based on the second group type information. Also, the robot 100 may display a UI instructing the identified routes and UIs 830, 840 instructing a recommended route and a backup route through the display 150.

According to an embodiment, if a user instruction for selecting a route is received through the UIs 830, 840 instructing a recommended route and a backup route, the robot 100 may perform the route guidance function based on one route from among the recommended first route 801 or the backup second route 802 based on the received instruction.

According to another embodiment, the robot 100 may perform the route guidance function based on the recommended first route 801, and at the same time, provide route information corresponding to the backup second route 802 through the display 150. In this case, in case the user input a user instruction for selecting the backup second route 802, the robot 100 may perform the route guidance function based on the backup second route 802.

Meanwhile, the robot 100 may receive input of a user instruction for changing information regarding at least one from among the recommended first route 801 or the backup second route 802 from the users included in the group through the UI on the display 150. Also, the robot 100 may perform the route guidance function based on the changed route information.

Figure 9:
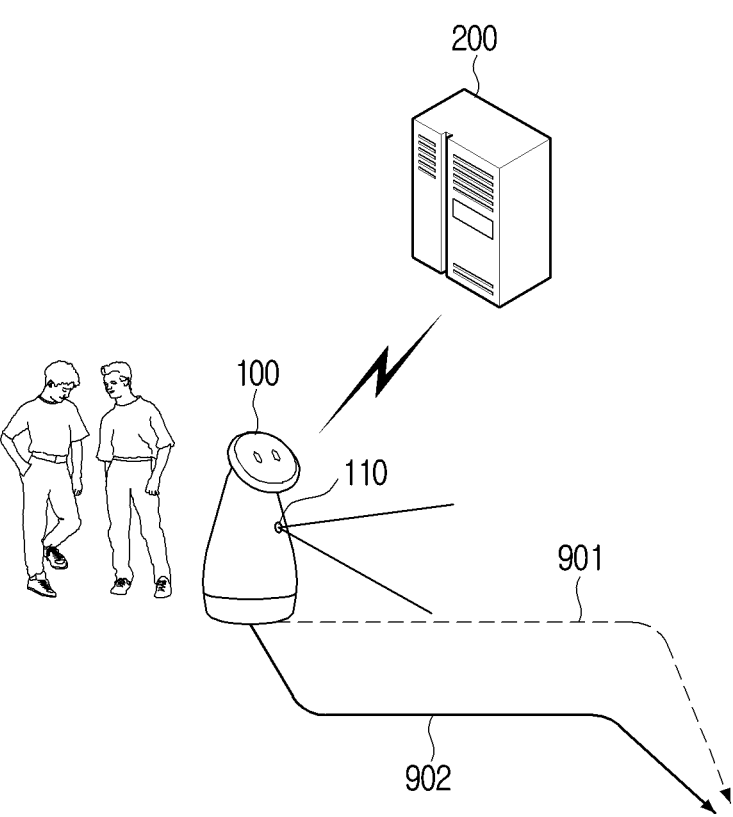
FIG. 9 is a diagram for illustrating a route guiding operation based on ambient environment information according to an embodiment of the disclosure.

FIG. 9 is a diagram for illustrating a route guiding operation based on ambient environment information according to an embodiment of the disclosure.

Referring to FIG. 9, a robot 100 may identify whether route change is necessary based on at least one of ambient environment information received from a server 200 or ambient environment information acquired through the camera 110 while performing the route guidance function along a moving route 901 acquired based on group feature information of a group including a plurality of users and destination information.

Specifically, the robot 100 may identify, based on generation of an event such as a case wherein an accident occurred on a specific point on the existing moving route 901 or a case wherein the traffic on the existing route increased, etc., that there is a need to change the existing moving route 901.

In this case, the robot 100 may identify a new moving route 902 appropriate for the group based on the group feature information and the destination information updated based on the newly acquired ambient environment information, and replace the existing moving route 901 with the identified new moving route 902. Also, the robot 100 may perform the route guidance function along the new moving route 902, and display a UI guiding route information corresponding to the new moving route 902 through the display.

Figure 10:
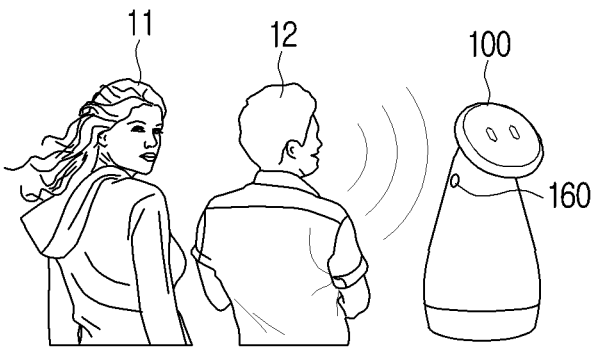
FIG. 10 is a diagram for illustrating an operation of acquiring priority information based on utterance identification according to an embodiment of the disclosure.

FIG. 10 is a diagram for illustrating an operation of acquiring priority information based on utterance identification according to an embodiment of the disclosure.

Referring to FIG. 10, if it is identified that the profile information of the plurality of users is similar, a robot 100 may identify a main speaker among the plurality of users 11, 12 based on an image captured via the camera 110. In case it is identified that the plurality of users 11, 12 belong to the same age group, and both of them are non-disabled people, the robot 100 according to an embodiment may identify which user from among the plurality of users 11, 12 is the main speaker.

The robot 100 may further include a microphone 160 for identifying the main speaker more correctly. The robot 100 may identify who the main speaker is based on the image captured via the camera 110 and voice data acquired via the microphone 160. Specifically, the robot 100 may identify that a man (e.g., second user 12) who is a speaker of a low vocal range moving his mouth is the main speaker based on the shapes of the mouths of each of the plurality of users included in the image and a plurality of user voices included in the voice data.

Also, the robot 100 may acquire priority information of the plurality of users 11, 12 based on the identified main speaker. The robot 100 according to an embodiment may identify that the man (e.g., second user 12) identified as the main speaker has the highest priority in the group, and perform the route guidance function based on feature information of the group wherein the man (e.g., second user 12) has a high priority.

Figure 11:
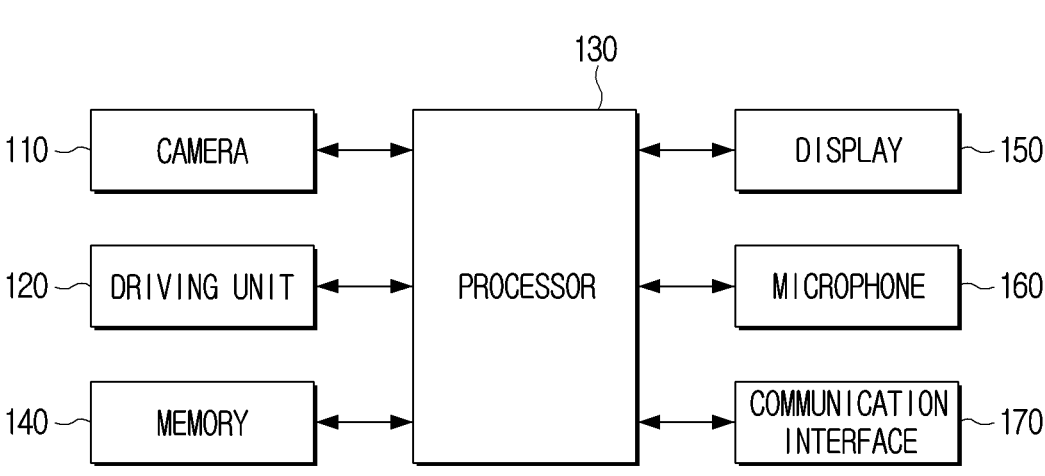
FIG. 11 is a block diagram for illustrating in detail a configuration of a robot according to an embodiment of the disclosure.

FIG. 11 is a block diagram for illustrating in detail a configuration of a robot according to an embodiment of the disclosure.

Referring to FIG. 11, a robot 100 may include a camera 110, a driving unit 120, a processor 130, memory 140, a display 150, a microphone 160, and a communication interface 170. Among the components illustrated in FIG. 11, regarding components that overlap with the components illustrated in FIG. 2, detailed explanation will be omitted.

The memory 140 may store data necessary for the various embodiments of the disclosure. The memory 140 may be implemented in a form of a memory embedded in the robot 100, or in a form of a memory that can be attached to or detached from the robot 100, according to the usage of stored data. For example, in the case of data for operating the robot 100, the data may be stored in a memory embedded in the robot 100, and in the case of data for an extended function of the robot 100, the data may be stored in a memory that can be attached to or detached from the robot 100. Meanwhile, in the case of a memory embedded in the robot 100, the memory may be implemented as at least one of a volatile memory (e.g.: a dynamic RAM (DRAM), a static RAM (SRAM), or a synchronous dynamic RAM (SDRAM), etc.) or a non-volatile memory (e.g.: an one time programmable read only memory (ROM) (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive, or a solid state drive (SSD)). Also, in the case of a memory that can be attached to or detached from the robot 100, the memory may be implemented in forms such as a memory card (e.g., compact flash (CF), secure digital (SD), micro secure digital (Micro-SD), mini secure digital (Mini-SD), extreme digital (xD), a multi-media card (MMC), etc.), an external memory that can be connected to a universal serial bus (USB) port (e.g., a USB memory), etc.

Also, the memory 140 according to an embodiment may store at least one neural network model.

The display 150 may be implemented as displays in various forms such as a liquid crystal display (LCD), an organic light emitting diodes (OLED) display, a quantum dot light-emitting diodes (QLED) display, a plasma display panel (PDP), etc. Inside the display 150, a driving circuit that may be implemented in forms such as a thin film transistor (TFT), a low temperature poly silicon (LTPS) TFT, an organic TFT (OTFT), etc., and a backlight unit, etc. may also be included together. Meanwhile, the display 150 may be implemented as a flexible display, a 3D display, etc.

Also, the display 150 according to an embodiment of the disclosure may include a touch screen combined with a touch sensor.

The microphone 160 is a component that acquires an input sound by receiving a user's voice and an ambient noise signal. Specifically, the microphone 160 is a component that generally refers to a device that receives input of a sound wave, and generates a current of the same waveform as this. The processor 130 according to an embodiment may convert a sound signal included in an input sound into a digital signal based on a current of a waveform generated by the microphone 160.

The communication interface 170 may input and output various types of data. For example, the communication interface 170 may transmit and receive various types of data with an external device (e.g., a source device), an external storage medium (e.g., a USB memory), and an external server (e.g., a webhard) through communication methods such as Wi-Fi based on AP (a wireless local area network (LAN)), Bluetooth, Zigbee, a wired/wireless LAN, a wide area network (WAN), Ethernet, IEEE 1394, a high-definition multimedia interface (HDMI), a universal serial bus (USB), a mobile high-definition link (MHL), Audio Engineering Society/European Broadcasting Union (AES/EBU), Optical, Coaxial, etc.

The processor 130 according to an embodiment may receive ambient environment information from an external server or another robot through the communication interface 170.

Figure 12:
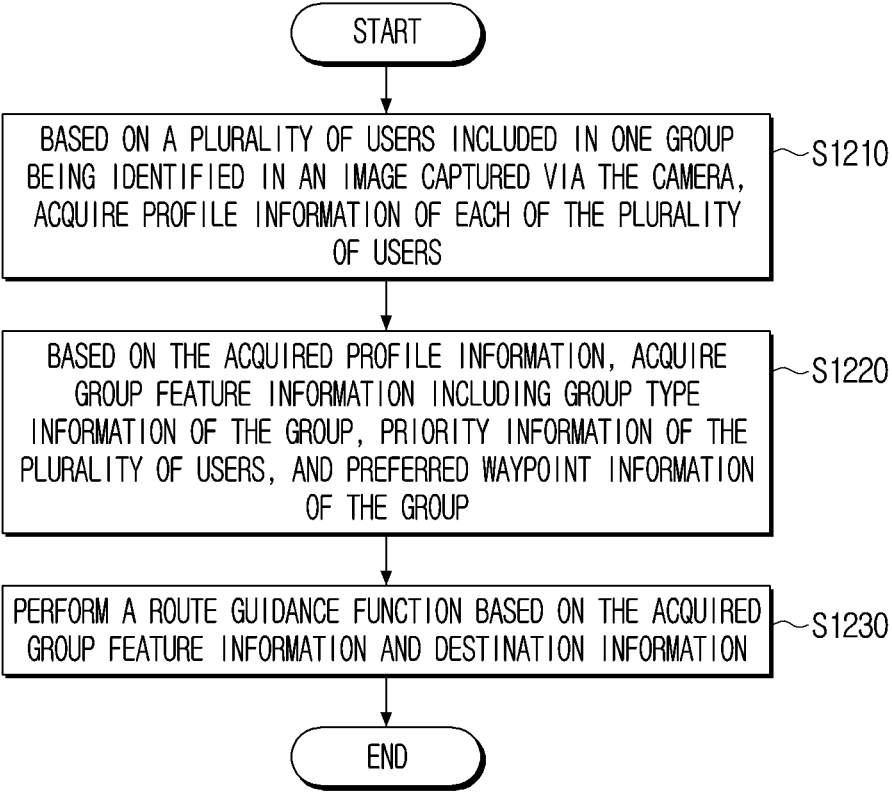
FIG. 12 is a flowchart for illustrating a control method according to an embodiment of the disclosure.

FIG. 12 is a flowchart for illustrating a control method according to an embodiment of the disclosure.

Referring to FIG. 12, in a control method according to an embodiment of the disclosure, if a plurality of users included in one group are identified in an image captured via a camera, profile information of each of the plurality of users is acquired, in operation S1210.

Then, based on the acquired profile information, group feature information including group type information of the group, priority information of the plurality of users, and preferred waypoint information of the group is acquired, in operation S1220.

Lastly, a route guidance function is performed based on the acquired group feature information and destination information, in operation S1230.

Here, the group feature information may further include transit impossible route information and preferred speed information identified based on the acquired profile information.

Here, in the operation S1220 of acquiring the group feature information, at least one of the preferred waypoint information, the transit impossible route information, or the preferred speed information of the group may be identified based on at least one profile information among the profile information of each of the plurality of users based on the priority information of the plurality of users.

Also, the control method may further include the steps of, based on at least one user included in the one group being changed in the image captured via the camera after the plurality of users were identified, acquiring profile information of the changed user, and reidentifying the group feature information including the group type information of the group, the priority information of the users included in the group, and the preferred waypoint information of the group based on the acquired profile information of the user.

In addition, in the operation S1220 of acquiring the group feature information, based on the group type information being acquired, the priority information of the plurality of users may be acquired based on priority information of users of each group type.

Further, the operation S1220 of acquiring the group feature information may include the step of, based on the probability that at least one user would be included in the group being greater than or equal to a first threshold probability and smaller than a second threshold probability, identifying first group type information corresponding to a case wherein the at least one user is included in the group and second group type information corresponding to a case wherein the at least one user is not included in the group, and the operation S1230 of performing the route guidance function may include the steps of performing the route guidance function based on any one of the first group type information or the second group type information, and displaying route information identified based on the other one of the first group type information or the second group type information.

Also, the control method may further include the step of, based on identifying that route change is necessary based on at least one of ambient environment information received from a server or ambient environment information acquired through the camera while performing the route guidance function on the basis of the acquired group feature information and destination information, displaying a user interface (UI) guiding route information corresponding to the changed route.

In addition, the operation S1230 of performing the route guidance function may include the steps of displaying route information determined based on the acquired group feature information and destination information, and based on the displayed route information being selected according to a user instruction, performing the route guidance function according to the displayed route information, and based on the displayed route information being changed according to the user instruction, performing the route guidance function according to the changed route information.

Further, the operation S1220 of acquiring the group feature information may include the steps of, based on identifying that the profile information of the plurality of users is similar, identifying a main speaker among the plurality of users based on the image captured via the camera, and acquiring the priority information of the plurality of users based on the identified main speaker.

Also, the profile information may include at least one of sex information, age information, belongings information, disability information, or clothes information of the users.

Meanwhile, the methods according to the various embodiments of the disclosure as described above may be implemented in forms of applications that can be installed on conventional robots.

Also, the methods according to the various embodiments of the disclosure as described above may be implemented just with software upgrade, or hardware upgrade of conventional robots.

In addition, the methods according to the various embodiments of the disclosure as described above may be performed through an embedded server provided on a robot, or at least one external server.

Meanwhile, the various embodiments described above may be implemented in a recording medium that can be read by a computer or a device similar to a computer, by using software, hardware, or a combination thereof. In some cases, the embodiments described in this specification may be implemented as the processor 130 itself. According to implementation by software, the embodiments such as procedures and functions described in this specification may be implemented as separate software modules. Each of the software modules can perform one or more functions and operations described in this specification.

Meanwhile, computer instructions for performing processing operations of the robot 100 according to the aforementioned various embodiments of the disclosure may be stored in a non-transitory computer-readable medium. Computer instructions stored in such a non-transitory computer-readable medium may make the processing operations at the robot 100 according to the aforementioned various embodiments performed by a specific machine, when the instructions are executed by the processor of the specific machine.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a compact disc (CD), a digital versatile disc (DVD), a hard disk, a blue-ray disc, a USB, a memory card, a ROM and the like.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A robot comprising:
a camera;
a driver;
memory, comprising one or more storage media, storing instructions; and
at least one processor communicatively coupled to the camera, the driver, and the memory;
wherein the instructions, when executed by the at least one processor individually or collectively, cause the robot to:
    based on a plurality of users included in one group being identified in an image captured via the camera, acquire profile information of each of the plurality of users,
    based on the profile information, acquire group feature information comprising group type information of the one group, priority information of the plurality of users, and preferred waypoint information of the one group, and
    control the driver to perform a route guidance function based on the group feature information and destination information, and
  wherein the preferred waypoint information of the one group is identified based on at least one piece of profile information among the profile information of each of the plurality of users and the priority information of the plurality of users.

2. The robot of claim 1, wherein the group feature information further comprises:
transit impossible route information and preferred speed information identified based on the profile information.

3. The robot of claim 2, wherein the instructions, when executed by the at least one processor individually or collectively, further cause the robot to:
identify one of the preferred waypoint information, the transit impossible route information, or the preferred speed information of the one group based on at least one piece of profile information among the profile information of each of the plurality of users and the priority information of the plurality of users.

4. The robot of claim 1, wherein the instructions, when executed by the at least one processor individually or collectively, further cause the robot to:
based on at least one user included in the one group being changed in the image captured via the camera after the plurality of users were identified, acquire profile information of the at least one user; and
reidentify the group feature information including the group type information of the one group, the priority information of the plurality of users included in the one group, and the preferred waypoint information of the one group based on the profile information of the at least one user.

5. The robot of claim 1,
wherein the memory stores priority information of users of each group type, and
wherein the instructions, when executed by the at least one processor individually or collectively, further cause the robot to:
based on the group type information being acquired, acquire the priority information of the plurality of users based on the priority information of users of each group type stored in the memory.

6. The robot of claim 1, further comprising:
a display,
wherein the instructions, when executed by the at least one processor individually or collectively, further cause the robot to:
based on a probability that at least one user would be included in the one group being greater than or equal to a first threshold probability and smaller than a second threshold probability, identify first group type information corresponding to a first case in which the at least one user is included in the one group and second group type information corresponding to a second case in which the at least one user is not included in the one group,
control the driver to perform the route guidance function based on a first one of the first group type information or the second group type information, and
control the display to display route information identified based on a second one of the first group type information or the second group type information different from the first one.

7. The robot of claim 1, further comprising:
a display,
wherein the instructions, when executed by the at least one processor individually or collectively, further cause the robot to:
based on identifying that a route change is necessary based on at least one of ambient environment information received from a server or ambient environment information acquired through the camera while performing the route guidance function based on the group feature information and the destination information, control the display to display a user interface (UI) guiding route information corresponding to a changed route.

8. The robot of claim 1, further comprising:
a display,
wherein the instructions, when executed by the at least one processor individually or collectively, further cause the robot to:
control the display to display route information determined based on the group feature information and the destination information,
based on the displayed route information being selected according to a first user instruction, control the driver to perform the route guidance function according to the displayed route information, and
based on the displayed route information changing according to a second user instruction, control the driver to perform the route guidance function according to changed route information.

9. The robot of claim 1, further comprising:
a microphone,
wherein the instructions, when executed by the at least one processor individually or collectively, further cause the robot to:
perform the route guidance function based on a user voice received through the microphone,
based on identifying that the profile information of the plurality of users is similar, identify a main speaker among the plurality of users based on the image captured via the camera, and
acquire the priority information of the plurality of users based on the main speaker.

10. The robot of claim 1, wherein the profile information comprises:

at least one of sex information, age information, belongings information, disability information, or clothes information of the plurality of users.

11. A control method of a robot, the method comprising:

based on a plurality of users included in one group being identified in an image captured via a camera, acquiring profile information of each of the plurality of users;

based on the profile information, acquiring group feature information comprising group type information of the one group, priority information of the plurality of users, and preferred waypoint information of the one group; and performing a route guidance function based on the group feature information and destination information, wherein the preferred waypoint information of the one group is identified based on at least one piece of profile information among the profile information of each of the plurality of users and the priority information of the plurality of users.

12. The control method of claim 11, wherein the group feature information further comprises:

transit impossible route information and preferred speed information identified based on the profile information.

13. The control method of claim 12, wherein the acquiring of the group feature information comprises:

identifying at least one of the preferred waypoint information, the transit impossible route information, or the preferred speed information of the one group based on at least one piece of profile information among the profile information of each of the plurality of users and the priority information of the plurality of users.

14. The control method of claim 11, further comprising:

based on at least one user included in the one group being changed in the image captured via the camera after the plurality of users were identified, acquiring profile information of the at least one user; and reidentifying the group feature information including the group type information of the one group, the priority information of the plurality of users included in the one group, and the preferred waypoint information of the one group based on the profile information of the at least one user.

15. The control method of claim 11, wherein the acquiring of the group feature information comprises:

based on the group type information being acquired, acquiring the priority information of the plurality of users based on priority information of users of each group type.

16. The control method of claim 11, further comprising:

based on a probability that at least one user would be included in the one group being greater than or equal to a first threshold probability and smaller than a second threshold probability, identifying first group type information corresponding to a first case in which the at least one user is included in the one group and second group type information corresponding to a second case in which the at least one user is not included in the one group;

performing the route guidance function based on a first one of the first group type information or the second group type information; and displaying route information identified based on a second one of the first group type information or the second group type information different from the first one.

17. The method of claim 11, further comprising:

based on identifying that a route change is necessary based on at least one of ambient environment information received from a server or ambient environment information acquired through the camera while performing the route guidance function based on the group feature information and the destination information, displaying a user interface (UI) guiding route information corresponding to a changed route.

18. The method of claim 11, further comprising:

displaying route information determined based on the group feature information and the destination information;

based on the displayed route information being selected according to a first user instruction, performing the route guidance function according to the displayed route information; and based on the displayed route information changing according to a second user instruction, performing the route guidance function according to changed route information.

19. One or more non-transitory computer-readable storage media storing one or more programs including instructions that, when executed by one or more processors of a robot, cause the robot to perform operations, the operations comprising:

based on a plurality of users included in one group being identified in an image captured via a camera, acquiring profile information of each of the plurality of users;

based on the profile information, acquiring group feature information comprising group type information of the one group, priority information of the plurality of users, and preferred waypoint information of the one group; and performing a route guidance function based on the group feature information and destination information, wherein the preferred waypoint information of the one group is identified based on at least one piece of profile information among the profile information of each of the plurality of users and the priority information of the plurality of users.

20. The one or more non-transitory computer-readable storage media of claim 19, wherein the group feature information further comprises:

transit impossible route information and preferred speed information identified based on the profile information.

* * * * *